US012728818B2

(12) United States Patent
Chinthalapudi et al.

(10) Patent No.: US 12,728,818 B2
(45) Date of Patent: Sep. 8, 2026

(54) CONTROL ALGORITHM UTILIZING AUTONOMOUS SENSORS FOR OPEN ON APPROACH SIDE DOORS

(71) Applicant: GM Global Technology Operations LLC, Detroit, MI (US)

(72) Inventors: Siva Chinthalapudi, Novi, MI (US); Mati Goro, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 18/829,579

(22) Filed: Sep. 10, 2024

(65) Prior Publication Data

US 2026/0070513 A1 Mar. 12, 2026

(51) Int. Cl.

| | |
|---|---|
| ***B60R 25/31*** | (2013.01) |
| ***B60R 25/01*** | (2013.01) |
| ***B60R 25/24*** | (2013.01) |
| ***B60R 25/30*** | (2013.01) |
| ***E05F 15/73*** | (2015.01) |
| ***E05F 15/76*** | (2015.01) |
| ***G06N 20/00*** | (2019.01) |

(52) U.S. Cl.
CPC .............. *B60R 25/31* (2013.01); *B60R 25/01* (2013.01); *B60R 25/24* (2013.01); *B60R 25/305* (2013.01); *E05F 15/76* (2015.01); *G06N 20/00* (2019.01); *E05F 2015/765* (2015.01); *E05F 2015/767* (2015.01); *E05Y 2400/8505* (2024.05); *E05Y 2900/531* (2013.01)

(58) Field of Classification Search
None
See application file for complete search history.

(56) References Cited

U.S. PATENT DOCUMENTS

| | | | | |
|---|---|---|---|---|
| 10,850,709 | B1 * | 12/2020 | Nagata | B60R 25/241 |
| 2016/0300410 | A1 * | 10/2016 | Jones | G07C 9/253 |
| 2018/0236972 | A1 * | 8/2018 | Linden | B60R 25/01 |
| 2022/0290484 | A1 * | 9/2022 | Salter | B60J 5/047 |

* cited by examiner

*Primary Examiner* — Shayne M. Gilbertson
(74) *Attorney, Agent, or Firm* — Honigman LLP; Matthew H. Szalach

(57) ABSTRACT

A system and method include detecting an authenticated device in a proximity zone of a vehicle, activating a perception system for the proximity zone of the vehicle, and detecting, in user data captured by the perception system, a user in the proximity zone of the vehicle and approaching the vehicle. The system and method also include classifying, based on the user data, an identity of the user in the proximity zone of the vehicle, identifying a target door of the vehicle for the user based on the classified identity of the user, and instructing the target door of the vehicle to automatically open for the user.

20 Claims, 5 Drawing Sheets

Detecting an Authenticated Device in a Proximity Zone of a Vehicle
502

Activating a Perception System for the Proximity Zone of the Vehicle
504

Detecting, in User Data Captured by the Perception System, a User in the Proximity Zone of the Vehicle and Approaching the Vehicle
506

Classifying, based on the User Data, an Identity of the User in the Proximity Zone of the Vehicle
508

Identifying a Target Door of the Vehicle for the User Based on the Classified Identity of the User
510

Instructing the Target Door of the Vehicle to Automatically Open for the User
512

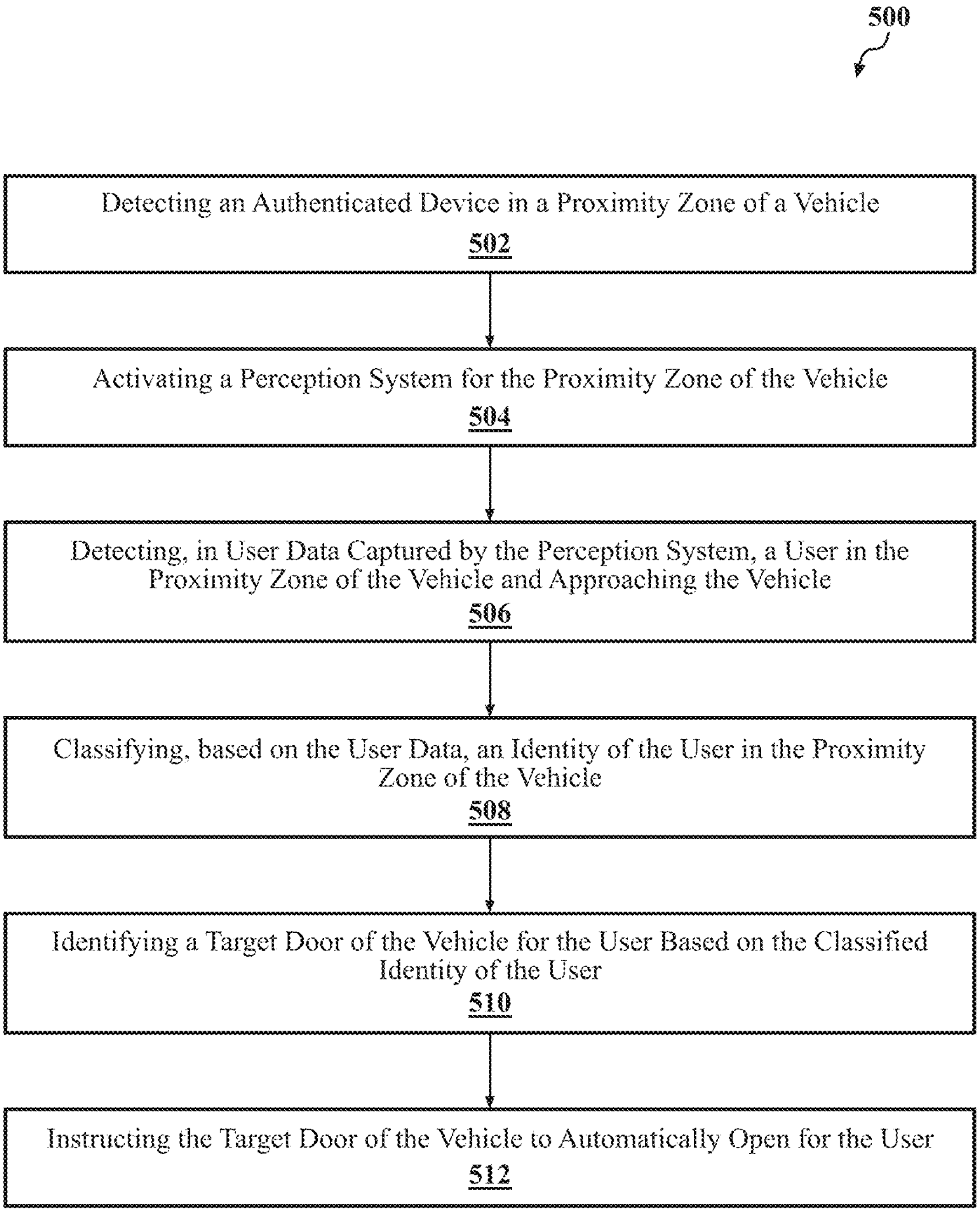

FIG. 5

CONTROL ALGORITHM UTILIZING AUTONOMOUS SENSORS FOR OPEN ON APPROACH SIDE DOORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to systems and methods of using autonomous sensors for open on approach side doors. Generally, vehicles use multiple autonomous sensors for detecting key fobs approaching vehicles, detecting users, and/or detecting potential collisions with the doors of the vehicles. These autonomous sensors may include passive entry passive start (PEPS) detection and/or door anti-collision radar (DAR) detection.

Notably, not all users that approach vehicles may have available hands to open doors, whether due to mobility challenges, or due to carrying belongings, pets, or other users (e.g., children). As such, a system that intelligently predicts and automatically opens the correct door for a user as the user approaches the vehicle would greatly enhance the user experience. Moreover, only opening the door that the user intends to open may increase safety of the vehicle by limiting the number of open/unlocked doors that may be accessed by threat actors when the user approaches the vehicle.

SUMMARY

One aspect of the disclosure provides a computer-implemented method for a control algorithm that utilizes autonomous sensors for open on approach side doors that when executed on data processing hardware causes the data processing hardware to perform operations that include detecting an authenticated device in a proximity zone of a vehicle, activating a perception system for the proximity zone of the vehicle, and detecting, in user data captured by the perception system, a user in the proximity zone of the vehicle and approaching the vehicle. The operations also include classifying, based on the user data, an identity of the user in the proximity zone of the vehicle, identifying a target door of the vehicle for the user based on the classified identity of the user, and instructing the target door of the vehicle to automatically open for the user.

Implementations of the disclosure may include one or more of the following optional features. In some implementations, detecting the authenticated device in the proximity zone of the vehicle includes receiving authentication data captured by an authentication system. Here, the authentication data indicates that the authenticated device is in the proximity zone of the vehicle. In some examples, the authenticated device includes one or more of a mobile device or a key fob. In some implementations, the perception system includes one or more of light detection and ranging (LIDAR) or a camera system.

In some examples, classifying, based on the user data, the identity of the user in the proximity zone of the vehicle includes comparing the user data to one or more user accounts, each user account associated with a registered user of the vehicle. In these examples, each user account of the one or more user accounts may include respective user characteristics of the registered user of the vehicle. Here, the respective user characteristics may include one or more of a height of the registered user, a width of the registered user, door preferences of the registered user, or a device of the registered user. Additionally or alternatively, the respective user characteristics may be added to the user account during a registration process.

In some implementations, identifying the target door of the vehicle for the user based on the classified identity of the user includes receiving, as input to a machine learning model, the classified identity of the user and one or more user characteristics of the user, and generating, as output, the target door. In these implementations, the operations may further include receiving user feedback indicating a user preference, and updating the machine learning model based on the user feedback.

Another aspect of the disclosure provides a system for a control algorithm that utilizes autonomous sensors for open on approach side doors that includes data processing hardware and memory hardware in communication with the data processing hardware. The memory hardware stores instructions that when executed by the data processing hardware cause the data processing hardware to perform operations that include detecting an authenticated device in a proximity zone of a vehicle, activating a perception system for the proximity zone of the vehicle, and detecting, in user data captured by the perception system, a user in the proximity zone of the vehicle and approaching the vehicle. The operations also include classifying, based on the user data, an identity of the user in the proximity zone of the vehicle, identifying a target door of the vehicle for the user based on the classified identity of the user, and instructing the target door of the vehicle to automatically open for the user.

This aspect may include one or more of the following optional features. In some implementations, detecting the authenticated device in the proximity zone of the vehicle includes receiving authentication data captured by an authentication system. Here, the authentication data indicates that the authenticated device is in the proximity zone of the vehicle. In some examples, the authenticated device includes one or more of a mobile device or a key fob. In some implementations, the perception system includes one or more of light detection and ranging (LIDAR) or a camera system.

In some examples, classifying, based on the user data, the identity of the user in the proximity zone of the vehicle includes comparing the user data to one or more user accounts, each user account associated with a registered user of the vehicle. In these examples, each user account of the one or more user accounts may include respective user characteristics of the registered user of the vehicle. Here, the respective user characteristics may include one or more of a height of the registered user, a width of the registered user, door preferences of the registered user, or a device of the registered user. Additionally or alternatively, the respective user characteristics may be added to the user account during a registration process.

In some implementations, identifying the target door of the vehicle for the user based on the classified identity of the user includes receiving, as input to a machine learning model, the classified identity of the user and one or more user characteristics of the user, and generating, as output, the target door. In these implementations, the operations may further include receiving user feedback indicating a user preference, and updating the machine learning model based on the user feedback.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

FIG. 5 is a flowchart of an example arrangement of operations for a method of a control algorithm utilizing autonomous sensors for open on approach side doors.

Corresponding reference numerals indicate corresponding parts throughout the drawings.

DETAILED DESCRIPTION

Figure 1:
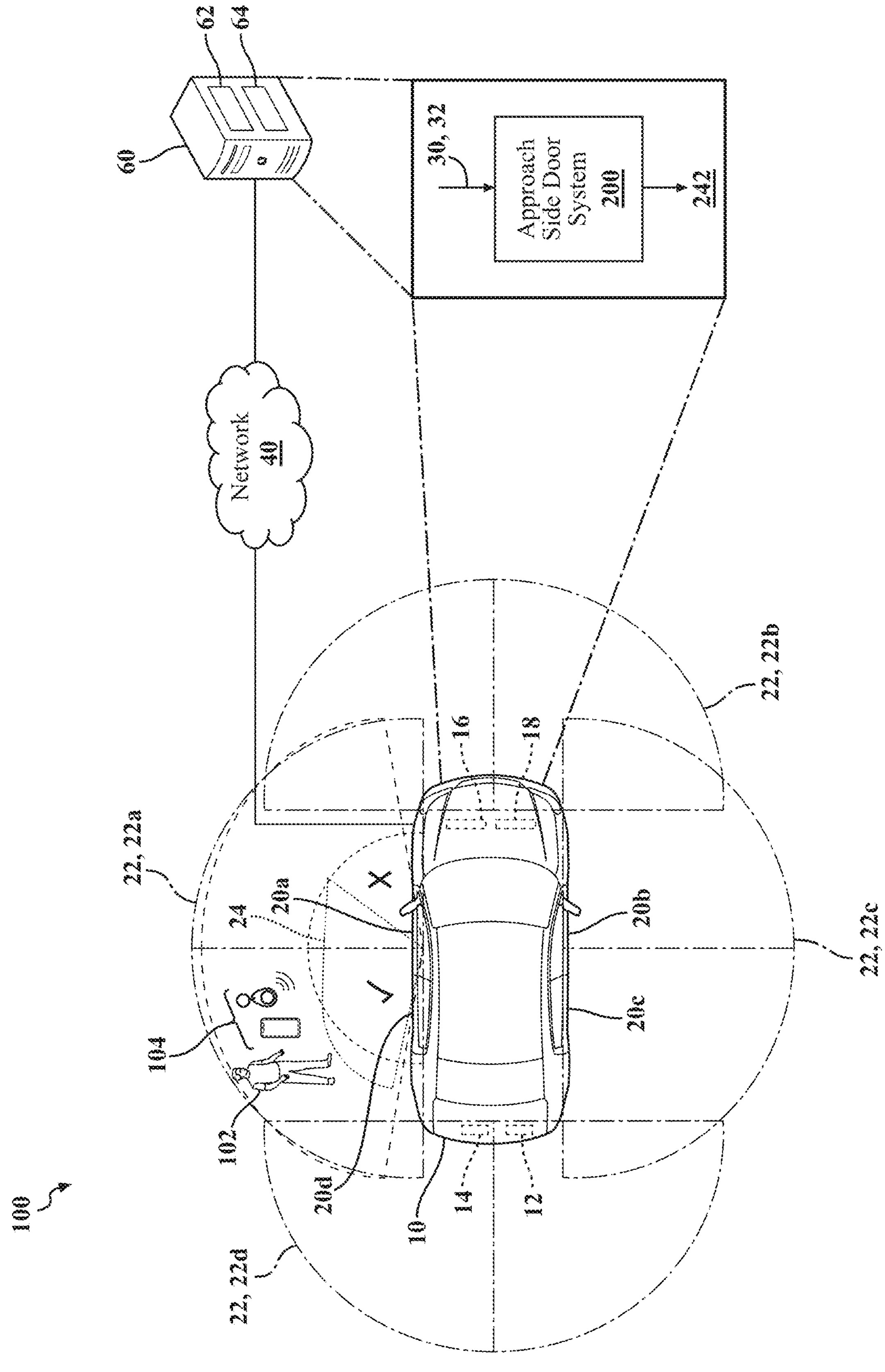
FIG. 1 is a schematic view of an example system for a control algorithm utilizing autonomous sensors for open on approach side doors.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, in some implementations, a system 100 includes a vehicle 10 and/or a remote system 60 in communication with the vehicle 10 via a network 40 (e.g., wired or wireless communication). The vehicle 10 and/or the remote system 60 execute an approach side door system 200 that operates to detect one or more users 102 approaching the vehicle 10, accurately detect and differentiate between the one or more users 102, and automatically open one or more doors 20, 20*a-d* of the vehicle 10 for the one or more users 102 without requiring the one or more users 102 to open the doors 20, 20*a-d*. Briefly, and as described in further detail below, the approach side door system 200 is configured to detect an authenticated device 104 of a user 102 in one of the proximity zones 22, 22*a*-22*d* of the vehicle 10, detect the user 102 of the authentication device 104 and, based on the user 102 and the particular proximity zone 22 that the user 102 is moving within, identify a target door 20 of the one or more doors 20 to automatically open for the user 102. Advantageously, by automatically opening the target door 20, the approach side door system 200 allows the one or more users 102 to access the vehicle 10 without physical interaction.

In the example shown, the approach side door system 200 is implemented within the vehicle 10. However, the approach side door system 200 may be implemented in any other propulsion system, such as, without limitation, motorcycles, trucks, off-road vehicles, farm equipment, trains, aircraft, and the like. The vehicle 10 includes data processing hardware 12 and memory hardware 14 storing instructions that when executed on the data processing hardware 12 cause the data processing hardware 12 to perform operations. The exterior of the vehicle 10 may be generally divided into one or more proximity zones 22, 22*a-n*, where each zone 22 corresponds to an area surrounding a portion of the vehicle 10 such that the proximity zones 22 collectively cover the 360-degree area surrounding the vehicle 10. As shown in FIG. 1, the vehicle 10 may include four (4) proximity zones 22*a*-22*d*, where proximity zone 22*a* corresponds to the left side of the vehicle 10 that extends along a length of the vehicle 10, proximity zone 22*b* corresponds to the front side of the vehicle 10, proximity zone 22*c* corresponds to the right side of the vehicle 10 that extends along the length of the vehicle 10, and proximity zone 22*d* corresponds to the rear side of the vehicle 10. While the proximity zones 22*a*-22*d* are shown to include an overlap between adjacent proximity zones 22, in some implementations adjacent proximity zones 22 may not overlap, and instead abut one another. Moreover, while the examples used generally refer to the four (4) proximity zones 22*a*-22*d*, it should be understood that the approach side door system 200 may divide the area surrounding the vehicle 10 into any number of proximity zones 22, such as, without limitation, two (2) proximity zones 22, six (6) proximity zones 22, or any further number of proximity zones 22.

The vehicle 10 further includes an authentication system 16 and the perception system 18. The authentication system 16 is configured to capture authentication data 30 within the proximity zones 22 of the vehicle 10. For example, the authentication data 30 may include a wireless communication signal transmitted by an authenticated device 104 of a user 102. As shown in FIG. 1, the authentication device 104 may refer to a mobile device of a registered user 102 of the vehicle 10 and/or a key fob associated with the vehicle 10. Here, the wireless communication signal may include, without limitation, a radio frequency identification (RFID) signal, a Bluetooth® signal, an infrared signal, an NFC signal, or an ultrasonic signal. In other examples, the wireless communication signal that the authentication system 16 captures is an audible or inaudible signal output from the authenticated device 104.

The perception system 18 is configured to capture user data 32 within the proximity zone 22 that the authenticated device 104 is detected. In some implementations, the perception system 18 remains in a dormant/inactive state, and only activates when the approach side door system 200 detects the authenticated device 104 within the proximity zone 22 of the vehicle 10. The perception system 18 may include one or more of light detection and ranging (LIDAR) or a camera system configured to capture image data. In some cases, to increase computational efficiency, the perception system 18 only captures user data 32 within the proximity zone 22 that includes the authenticated device 104. In other words, a portion of the perception system 18 that corresponds to the proximity zone 22 that includes the authenticated device 104 may activate/wake up, while portions of the perception system 18 that correspond to proximity zones 22 that do not include the authenticated device 104 remain inactive/dormant.

The remote system 60 (e.g., server, cloud computing environment) also includes data processing hardware 62 and memory hardware 64 storing instructions that when executed on the data processing hardware 62 cause the data processing hardware 62 to perform operations. In some implementations, execution of the approach side door system 200 is shared across the vehicle 10 and/or the remote system 60. As described in greater detail below with reference to FIG. 2, the approach side door system 200 executes a device detector module 210, a perception module 220, a user classifier 230, and a door selection model 240. In some implementations, the approach side door system 200 has access to a user data store 250 that records/stores a plurality of user accounts 252, 252*a-n*, each user account 252 associated with a registered user 102R of the vehicle 10 and having respective user characteristics 254, 254*a-n* of the registered user 102R and historical user feedback 256, 256*a-n* of the registered user 102R collected/recorded during previous interactions between the registered user 102R and the approach side door system 200. The user characteristics 254 may generally refer to one or more of a height $H_{102}$ of the registered user 102R, a width $W_{102}$ of the registered user 102R, door preferences of the registered user 102R, or a device 104 of the registered user 102R. The user data store 250 may be stored on any one of the memory hardware 14, 64.

Figure 2:
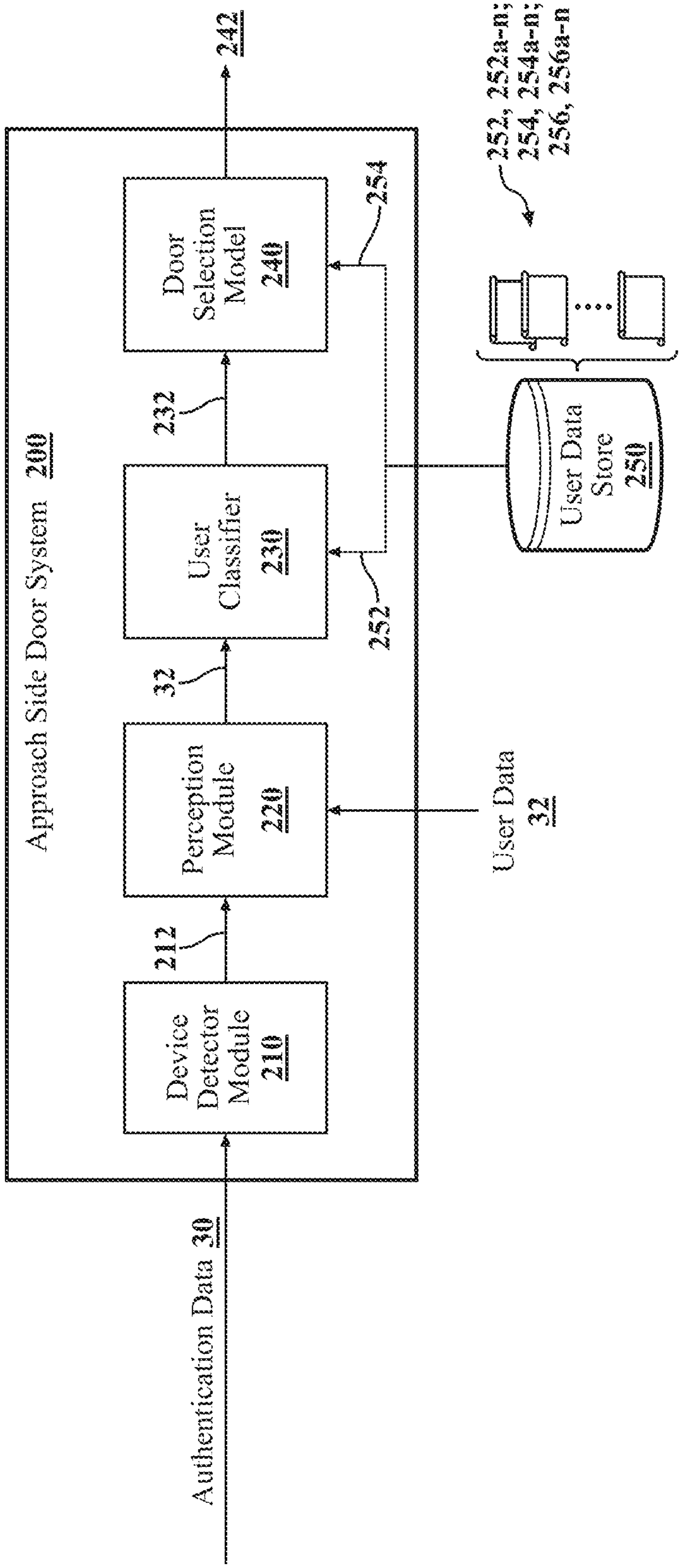
FIG. 2 is a schematic view of example components of the system of FIG. 1.

With continued reference to FIGS. 1 and 2, the device detector module 210 is configured to receive, as input, the authentication data 30 captured by the authentication system 16 and detect, in the authentication data 30, whether an authenticated device 104 is within one or more of the proximity zones 22 of the vehicle 10. In other words, the authentication data 30 may indicate that the authenticated device 104 is within the proximity zone 22 of the vehicle 10 when the strength of the wireless signal transmitted by the authenticated device 104 is above a threshold strength such that the authentication system 16 is capable of detecting the presence of the authenticated device 104. In some implementations, the device detector module 210 identifies, based on the authentication data 30, in which particular proximity zone 22 the authenticated device 104 is located. For example, as shown in FIG. 1, the user 102 is located in the proximity zone 22*a* and may be approaching the driver door 20*a* on the driver side of the vehicle 10. Here, the device detector module 210 determines, based on the authentication data 30, that the authenticated device 104 of the user 102 is located in the proximity zone 22*a* and generates a trigger 212 that activates/wakes up the portion of the perception system 18 that corresponds to the proximity zone 22*a* to begin collecting user data 32 within the proximity zone 22*a*.

Thereafter, the perception module 220 receives, as input, the user data 32 captured by the perception system 18 and, using image processing, detects, in the user data 32, whether a user 102 is in the proximity zone 22 of the vehicle 10 and is approaching the vehicle 10. Here, the user data 32 may include image data including a user 102 that the perception module 220 detects. Moreover, the user data 32 may include one or more frames of image data including the user 102 that indicate that the user is approaching (i.e., getting closer to) the vehicle 10.

The classifier module 230 may receive, as input, the user data 32 and, based on the user data 32, classify an identity 232 of the user 102. The identity 232 of the user 102 may refer to a class of user (e.g., adult, child) or a registered user 102R of the vehicle 10. For example, the classifier module 230 may estimate, based on the user data 32, a height $H_{102}$ of the user 102 and a width $W_{102}$ of the user 102 and classify the identity 232 of the user 102 as an adult (i.e., likely to sit in the driver or passenger seats of the vehicle 10) or a child (i.e., likely to sit in the back seat of the vehicle 10).

Additionally or alternatively, the user classifier 230 may obtain, as input, one or more user accounts 252 of corresponding registered users 102R of the vehicle 10 and compare the user data 32 to each of the user accounts 252. For example, as noted above, each user account 252 may include respective user characteristics 254 of the registered user 102R of the vehicle 10. The user characteristics 254 may include, without limitation, one or more of the height $H_{102}$ of the registered user 102R, the width $W_{102}$ of the registered user 102R, door preferences of the registered user 102R, or a device (e.g., an authenticated device 104) of the registered user 102R.

Figure 4:
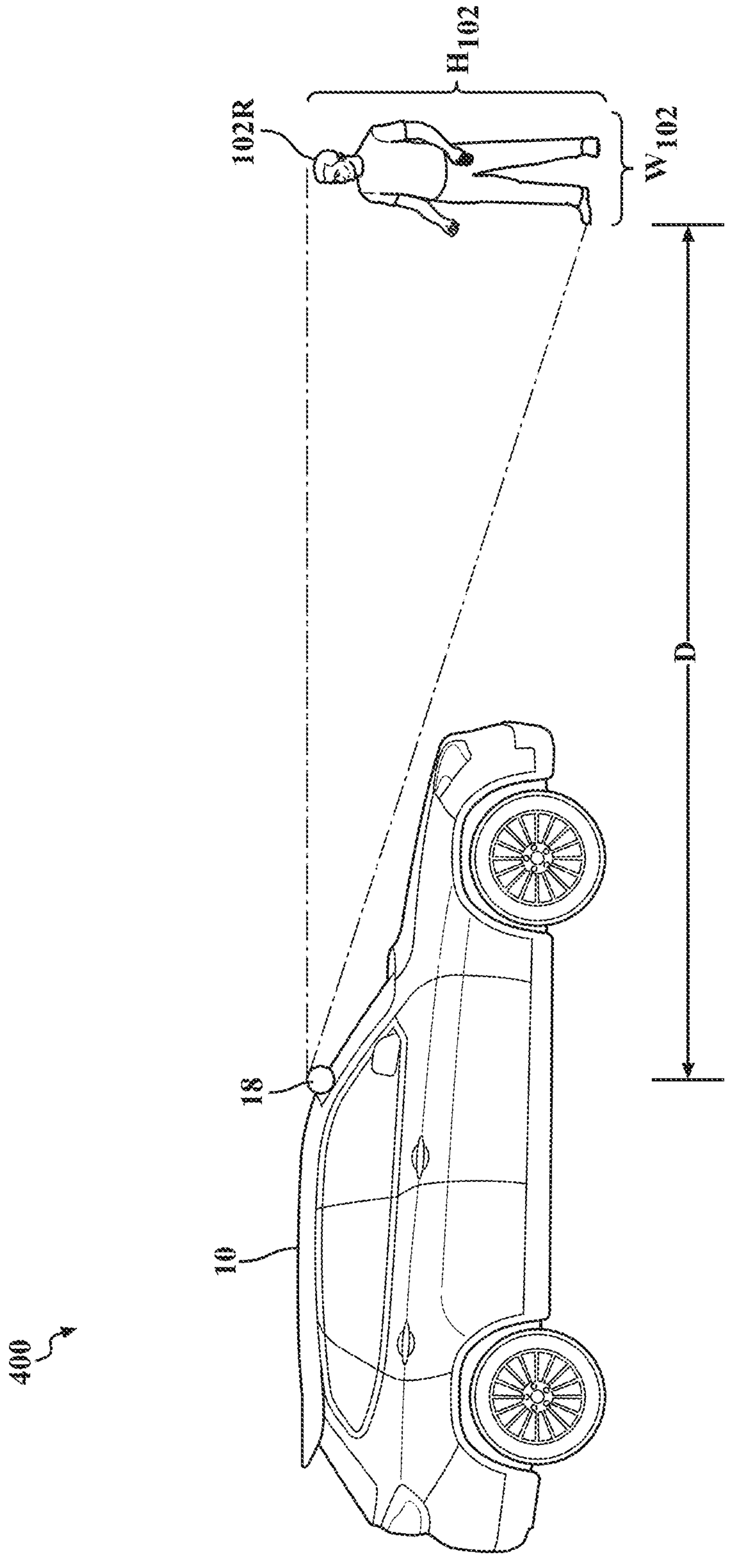
FIG. 4 is a schematic view of a registration process for the system of FIG. 1.

Referring briefly to FIG. 4, a registration process 400 is shown for a registered user 102R of the vehicle 10 to create a user account 252 including user characteristics 254 of the registered user 102R. For example, when the registered user 102R initiates the registration process 400, the registered user 102R may receive instructions from the vehicle 10 and/or an application published by the manufacturer of the vehicle 10 directing the registered user 102R to stand a configurable distance D from the perception system 18 of the vehicle 10. The perception system 18 may then collect user data 32 to provide to the perception module 220 to classify the registered user 102R. Here, the perception module 220 may calculate the height $H_{102}$ of the registered user 102R and the width $W_{102}$ of the registered user 102R and add the height $H_{102}$ and the width $W_{102}$ of the registered user 102R as user characteristics 254 of the user account 252. In some implementations, the perception module 220 calculates the height $H_{102}$ of the registered user 102R using the ground return to the top of the registered user 102R. Optionally, the registered user 102R may manually input user characteristics 254 (e.g., the height $H_{102}$, the width $W_{102}$, door preferences, and authenticated devices 104 of the registered user 102R) into the vehicle 10 to build the user account 252.

Referring again to FIGS. 1 and 2, the user classifier 230 analyzes the user data 32 and classifies the identity 232 of the user 102. In instances where the user data 32 corresponds to one of the user accounts 252, the user classifier 230 may classify the identity 232 of the user 102 as the registered user 102R belonging to the user account 252. The door selection model 240 may receive, as input, the identity 232 of the user 102 and predict/identify a target door 20 of the vehicle 10 for the user 102 based on the classified identity 232 of the user 102. For example, when the identity 232 of the user 102 is an adult and the user 102 further carries an authenticated device 104 (e.g., a mobile device), the door selection model 240 may identify that the target door 20 is the driver door 20*a* and generate instructions 242 instructing the target door 20*a* to open for the user 102. For example, the instructions 242 may specify that the target door 20*a* open when the user 102 enters an approach zone 24 of the vehicle 10 close enough to reach the open target door 20*a*.

Referring again to FIG. 2, in some implementations, the door selection model 240 includes a machine learning model. For instance, the machine learning model of the door selection model 240 may be continually fine-tuned/updated by reinforcement learning from user feedback. Here, the machine learning model may be configured to receive, as input, the identity 232 of the user 102 and the user characteristics 254 of the user 102 and generate as output, based on the user characteristics 254, the target door 20 for the user 102. Thereafter, the user 102 may provide user feedback indicating a user preference 256 of the user 102. For example, the user feedback may include an adult user 102 selecting a rear passenger door 20*c*, 20*d* when the target door 20 identified by the machine learning model was the passenger door 20*b*. This user feedback may indicate that the user 102 has a user preference 256 to sit in the rear of the vehicle 10 rather than the front seat of the vehicle 10. The approach side door system 200 may subsequently fine-tune the machine learning model of the door selection model 240 based on the user feedback indicating the user preference 256 to improve future predictions and instructions 242 by the door selection model 240.

While the example refers to a single user 102, it should be appreciated that the approach side door system 200 may be implemented with any number of users 102 of the vehicle 10. For example, where the door selection model 240 receives inputs of a first authenticated device 104 and a second authenticated device 104, and a classified identity of a first adult user 102 and a second adult user 102, the door selection model 240 may select the driver door 20*a* and the passenger door 20*b* as target doors 20*a*, 20*b*, and generate instructions 242 instructing the target doors 20*a*, 20*b* to open automatically for the first adult user 102 and the second adult user 102.

Figure 3:
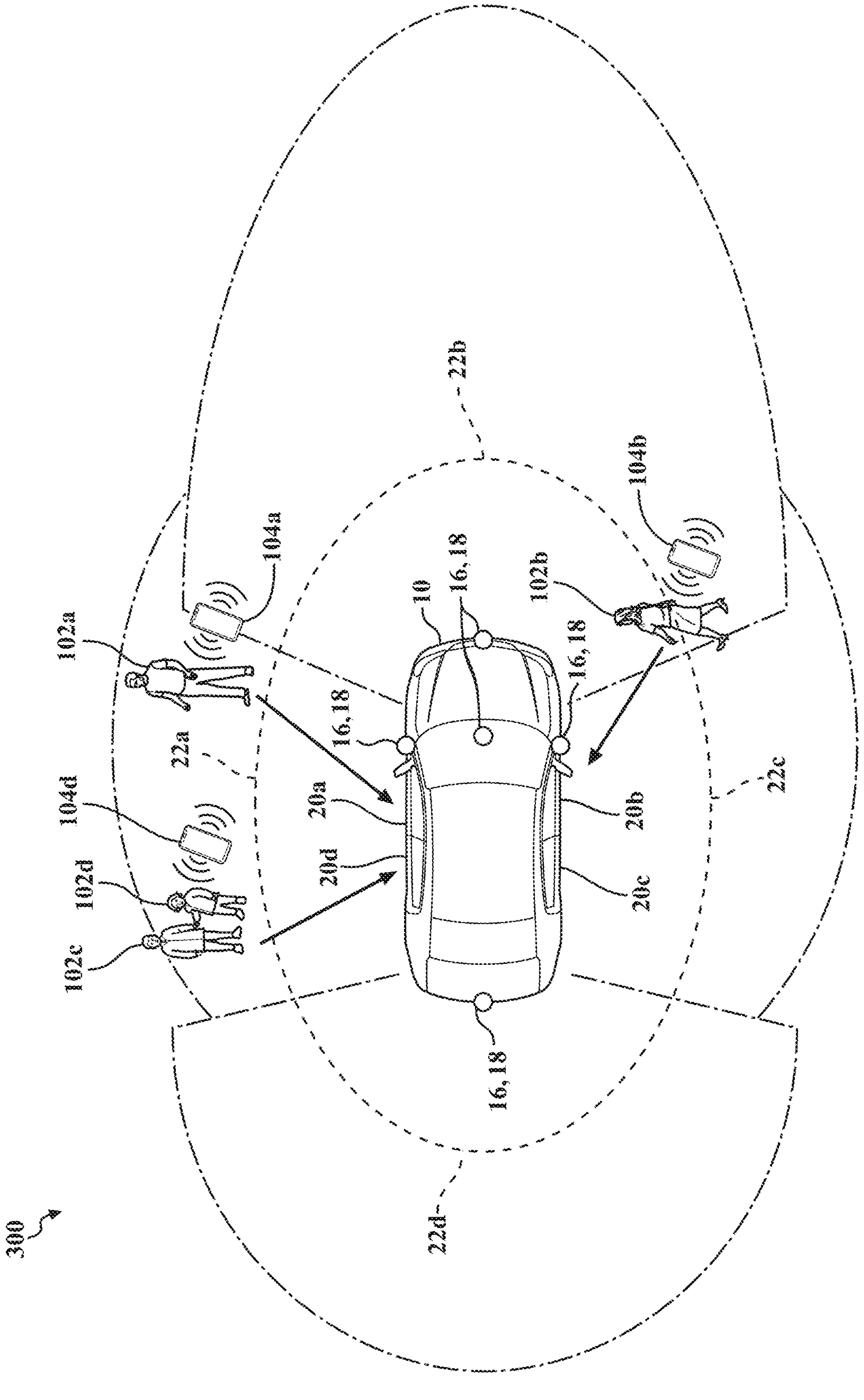
FIG. 3 is an example vehicle executing the system of FIG. 1.

Referring to FIG. 3, an example configuration 300 of users 102 is shown approaching the vehicle 10. As shown, the users 102 include a first user 102*a*, a second user 102*b*, a third user 102*c*, and a fourth user 102*d*. Here, each user 102*a*-102*d* has a respective authenticated device 104*a*-104*d* (e.g., a mobile device). As each user 102 approaches the vehicle 10, the device detector module 210 may detect, via authentication data 30, the authenticated devices 104*a*, 104*b*, 104*d* of the users 102*a*-102*d*, and trigger/activate the perception system 18 to collect user data 32 to provide as input to the perception module 220. Here, the device detector module 210 may identify the proximity zones 22*a*, 22*b* as containing the authenticated devices 104*a*, 104*b*, 104*d* such that only the portions of the perception system 18 that correspond to the proximity zones 22*a*, 22*b* are activated to collect user data 32. Alternatively, the full perception system 18 may activate to collect user data 32 of the 360-degree area around the vehicle 10.

Thereafter, the user classifier 230 may classify the identities 232*a*-232*d* of each of the users 102*a*-102*d*. For example, the user classifier 230 may detect the height $H_{102}$ and the width $W_{102}$ of each of the users 102*a*-102*d*, where the identity 232*a* of the first user 102*a* is an adult, the identity 232*b* of the second user 102*b* is an adult, the identity 232*c* of the third user 102*c* is a child, and the identity 232*d* of the fourth user 102*d* is a child.

Based on the identities 232*a*-232*d* of the users 102*a*-102*d*, the door selection model 240 may identify the target doors 20 for each of the users 102*a*-102*d*. In implementations where any of the users 102*a*-102*d* are registered users 102R, the door selection model 240 may further receive, as input, respective user characteristics 254 including door preferences of the users 102*a*-102*d*. In some cases, the door preferences may be provided by each of the users 102 during the registration process 400. Continuing with the example, the door selection model 240 may identify the driver door 20*a* as the target door 20 for the first user 102*a* having the identity 232*a* of an adult, the passenger door 20*b* as the target door 20 for the second user 102*b* having the identity 232*b* of an adult, and the left rear passenger door 20*d* as the target door for the third user 102*c* and the fourth user 102*d* each having identities 232*c*, 232*d* of children. The door selection model 240 may then generate instructions 242 instructing the doors 20*a*, 20*b*, 20*d* to automatically open for the users 102*a*-102*d* when the users 102*a*-102*d* reach the vehicle 10 (e.g., enter the approach zone 24).

FIG. 5 includes a flowchart of an example arrangement of operations for a method 500 for a control algorithm utilizing autonomous sensors for open on approach side doors 20. Data processing hardware (e.g., data processing hardware 12, 62 of FIG. 1) may execute instructions stored on memory hardware (e.g., memory hardware 14, 64 of FIG. 1) to perform the example arrangement of operations for the method 500. At operation 502, the method 500 includes detecting an authenticated device 104 in a proximity zone 22 of a vehicle 10. At operation 504, the method 500 also includes activating a perception system 19 for the proximity zone 22 of the vehicle 10. At operation 506, the method 500 further includes detecting, in user data 32 captured by the perception system 18, a user 102 in the proximity zone 22 of the vehicle 10 and approaching the vehicle 10.

At operation 508, the method 500 also includes classifying, based on the user data 32, an identity 232 of the user 102 in the proximity zone 22 of the vehicle 10. The method 500 also includes, at operation 510, identifying a target door 20 of the vehicle 10 for the user 102 based on the classified identity 232 of the user 102. At operation 512, the method 500 further includes instructing the target door 20 of the vehicle 10 to automatically open for the user 102.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed on data processing hardware, causes the data processing hardware to perform operations, the operations comprising:

detecting an authenticated device in a proximity zone of a vehicle, the proximity zone comprising one of a plurality of proximity zones that collectively cover a 360-degree area around an exterior of the vehicle;

based on the proximity zone, activating a portion of a perception system corresponding to the proximity zone of the vehicle while maintaining other portions of the perception system in an inactive state;

detecting, in user data captured by the portion of the perception system, a user in the proximity zone of the vehicle and approaching the vehicle;

classifying, based on the user data, an identity of the user in the proximity zone of the vehicle;

identifying a target door of the vehicle for the user based on the identity of the user; and instructing the target door of the vehicle to automatically open for the user when the user enters an approach zone within the proximity zone and adjacent to the target door.

2. The method of claim 1, wherein detecting the authenticated device in the proximity zone of the vehicle comprises receiving authentication data captured by an authentication system, the authentication data indicating that the authenticated device is in the proximity zone of the vehicle.

3. The method of claim 1, wherein the authenticated device comprises one or more of a mobile device or a key fob.

4. The method of claim 1, wherein the perception system comprises one or more of a light detection and ranging (LIDAR) system or a camera system.

5. The method of claim 1, wherein classifying, based on the user data, the identity of the user in the proximity zone of the vehicle comprises comparing the user data to one or more user accounts, each user account associated with a registered user of the vehicle.

6. The method of claim 5, wherein each user account of the one or more user accounts comprises respective user characteristics of the registered user of the vehicle.

7. The method of claim 6, wherein the respective user characteristics comprise one or more:

a height of the registered user;

a width of the registered user;

door preferences of the registered user; or a device of the registered user.

8. The method of claim 6, further comprising adding the respective user characteristics to the user account during a registration process.

9. The method of claim 1, wherein identifying the target door of the vehicle for the user based on the identity of the user comprises receiving, as input to a machine learning model, the identity of the user and one or more user characteristics of the user, and generating, as output, the target door.

10. The method of claim 9, wherein the operations further comprise:

receiving user feedback indicating a user preference; and updating the machine learning model based on the user feedback.

11. A system comprising:

data processing hardware; and memory hardware in communication with the data processing hardware, the memory hardware storing instructions that, when executed on the data processing hardware, cause the data processing hardware to perform operations, the operations comprising:

detecting an authenticated device in a proximity zone of a vehicle, the proximity zone comprising one of a plurality of proximity zones that collectively cover a 360-degree area around an exterior of the vehicle;

based on the proximity zone, activating a portion of a perception system corresponding to the proximity zone of the vehicle while maintaining other portions of the perception system in an inactive state;

detecting, in user data captured by the portion of the perception system, a user in the proximity zone of the vehicle and approaching the vehicle;

classifying, based on the user data, an identity of the user in the proximity zone of the vehicle;

identifying a target door of the vehicle for the user based on the identity of the user; and instructing the target door of the vehicle to automatically open for the user when the user enters an approach zone within the proximity zone and adjacent to the target door.

12. The system of claim 11, wherein detecting the authenticated device in the proximity zone of the vehicle comprises receiving authentication data captured by an authentication system, the authentication data indicating that the authenticated device is in the proximity zone of the vehicle.

13. The system of claim 11, wherein the authenticated device comprises one or more of a mobile device or a key fob.

14. The system of claim 11, wherein the perception system comprises one or more of a light detection and ranging (LIDAR) system or a camera system.

15. The system of claim 11, wherein classifying, based on the user data, the identity of the user in the proximity zone of the vehicle comprises comparing the user data to one or more user accounts, each user account associated with a registered user of the vehicle.

16. The system of claim 15, wherein each user account of the one or more user accounts comprises respective user characteristics of the registered user of the vehicle.

17. The system of claim 16, wherein the respective user characteristics comprise one or more:

a height of the registered user;

a width of the registered user;

door preferences of the registered user; or a device of the registered user.

18. The system of claim 16, wherein the respective user characteristics are added to the user account during a registration process.

19. The system of claim 11, wherein identifying the target door of the vehicle for the user based on the identity of the user comprises receiving, as input to a machine learning model, the identity of the user and one or more user characteristics of the user, and generating, as output, the target door.

20. The system of claim 19, wherein the operations further comprise:

receiving user feedback indicating a user preference; and updating the machine learning model based on the user feedback.

* * * * *